United States Patent [19]

Erickson

[11] 4,190,965

[45] Mar. 4, 1980

[54] FOOD DEHYDRATOR

[75] Inventor: Chad S. Erickson, Minneapolis, Minn.

[73] Assignee: Alternative Pioneering Systems, Inc., Minneapolis, Minn.

[21] Appl. No.: 3,473

[22] Filed: Jan. 15, 1979

[51] Int. Cl.² ............................................. F26B 25/18
[52] U.S. Cl. ........................................ 34/196; 34/197; 34/211; 34/238; 219/400
[58] Field of Search ................. 34/192, 195, 196, 197, 34/211, 225, 237, 238; 219/386, 400; 99/483; 126/21 A, 246, 261

[56] References Cited

U.S. PATENT DOCUMENTS

| | | | |
|---|---|---|---|
| 318,543 | 5/1885 | Collins | 34/192 X |
| 3,261,650 | 7/1966 | Stromquist | 34/196 X |
| 3,718,981 | 3/1973 | Breuning | 34/196 X |
| 4,052,589 | 10/1977 | Wyatt | 34/196 |
| 4,089,322 | 5/1978 | Guibert | 219/400 X |
| 4,126,775 | 11/1978 | Wyatt | 34/196 |

FOREIGN PATENT DOCUMENTS

| | | | |
|---|---|---|---|
| 658544 | 6/1929 | France | 34/196 |
| 76719 | 10/1917 | Switzerland | 34/195 |

Primary Examiner—Lloyd L. King
Assistant Examiner—Harold Joyce
Attorney, Agent, or Firm—Norman P. Friederichs

[57] ABSTRACT

A cylindrically shaped food dehydrator is disclosed including a base member, a plurality of stackable trays and a top member. The base member has a blower for moving air through the trays. The air flow in the trays moves from the circumference of the tray to the center of the tray.

6 Claims, 8 Drawing Figures

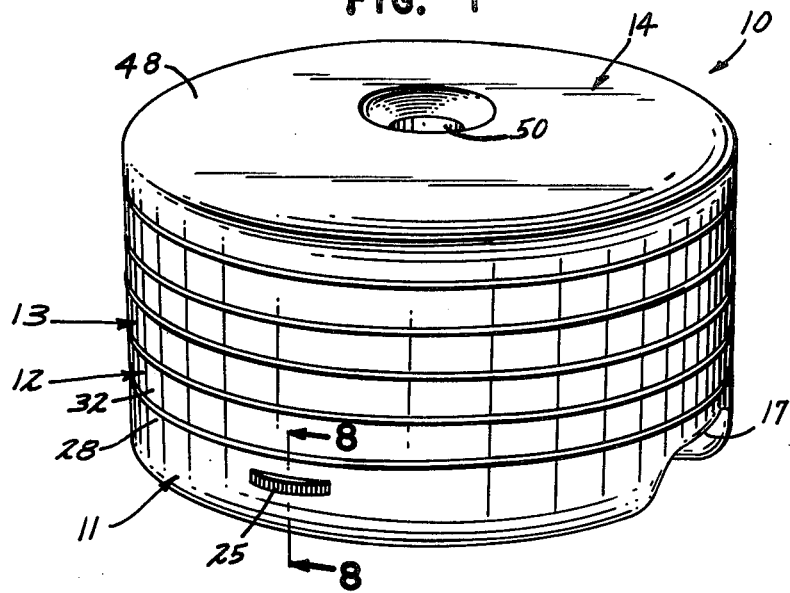
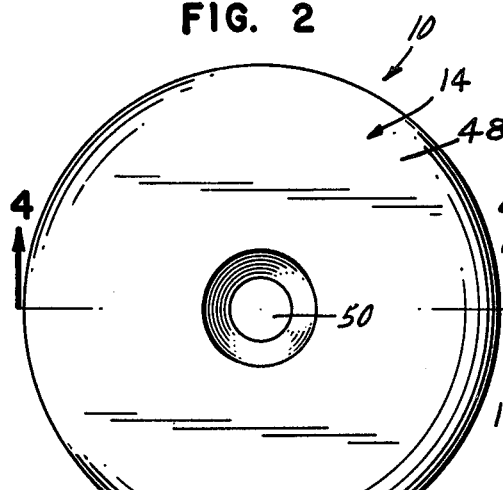
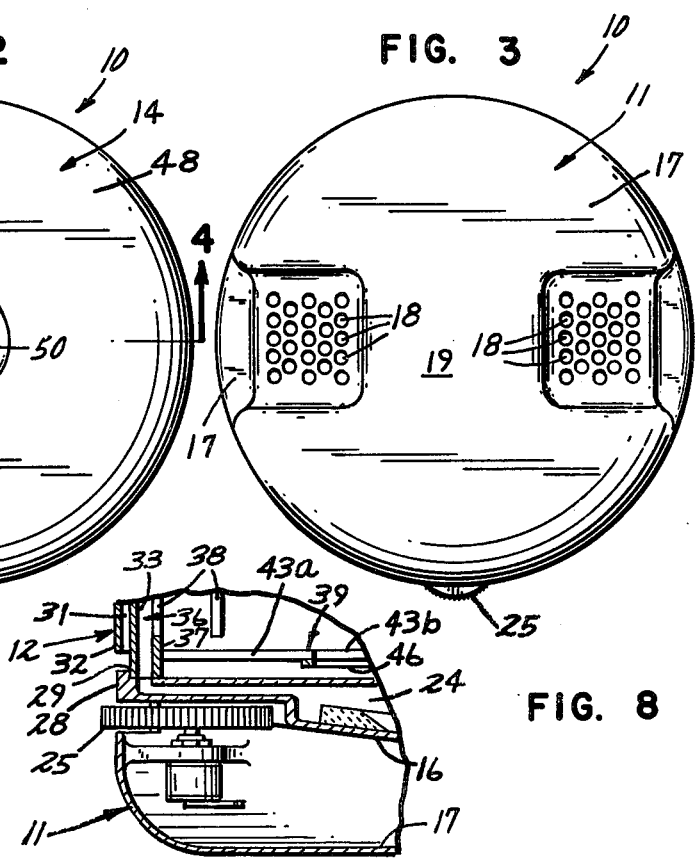

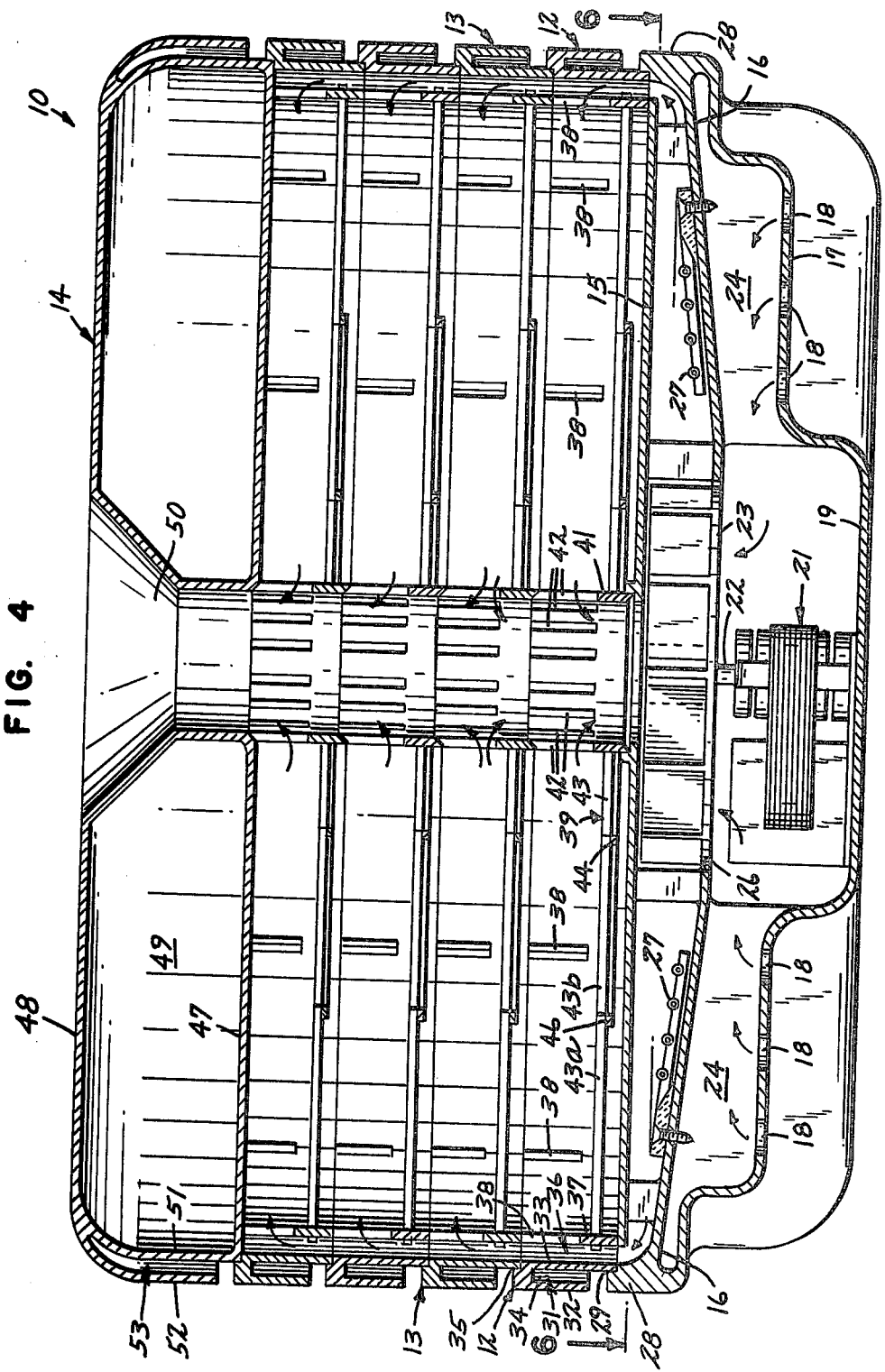

FOOD DEHYDRATOR

TECHNICAL FIELD

The present invention relates to apparatus for treating food and more particularly to apparatus for treating food by passing a heated stream of air over such food thereby dehydrating the food to a shelf stable condition.

BACKGROUND OF PRIOR ART

Preservation of food by dehydration has been known since the early history of man. The early dehydration of food was typically carried out by placing the food product in an open container exposed to the air and to the sun. No doubt early many noticed that dehydration took place more rapidly on windy days.

In recent times, mechanical food dehydrators have been developed for use in the home as well as in industry. The known food dehydrators often include a plurality of shelves contained within a cabinet. The cabinet also includes a blower which forces a heated air stream across each of the shelves. Illustrative of such devices include U.S. Pat. Nos. 1,954,239, 2,017,728 and 2,412,407.

One difficulty commonly occurring with known food dehydrators is lack of uniformity in the dehydration. In other words, foods located in certain areas of the dehydrator will dry more rapidly than food located in other areas of the dehydrator. Another common problem is the fact that the known dehydrators tends to be large and bulky thus being somewhat difficult to use and store in the home.

SUMMARY OF THE PRESENT INVENTION

The present invention provides food dehydrating apparatus which is substantially cylindrical in shape including a base member, a plurality of superimposed trays and a top member. The base member may include a blower for moving a stream of air through the dehydrator and a heating element for elevating the temperature of the air stream. At least a portion of the air stream moved by the blower is drawn into the dehydrator from the atmosphere.

The trays may be provided in any desired number and are stackable on the base member and upon one another so as to provide a column of trays. Any desired number of trays may be used at a given time. For example, one time a person may use three trays and another time one may use seven trays. The outer circumference of each tray may be an insulating zone provided by a pair of spaced wall portions. Inwardly of the insulating zone may be a duct which serves to carry the air stream upwardly from the base member to the respective tray through which the particular portion of air will travel. The duct may be provided by cooperation of the inwardmost wall of the insulating zone and a cooperating tray wall which is spaced axially inwardly from such insulation wall. The duct wall may include a plurality of openings which communicate with a tray portion capable of supporting food products. The supporting portion may be somewhat open so that air may pass through such supporting portion to an adjacent tray. The supporting portion may be in the form of a plurality of spoke-like members which are spaced slightly from one another and extend from the duct wall to an inner hub wall. The spoke-like support portion may be strengthened by one or more ring-like ribs disposed on the lower side of the spoke-like members. The hub may include a plurality of openings such that air may move from the food containing area into a central duct defined by the hub wall. The trays may each include projections or channels which axially lock adjacent trays and bottom member.

The top member serves to enclose the uppermost tray and desirably includes a pair of substantially horizontally disposed spaced wall portions which serves to insulate. The top member may include suitable projections or channels for axially locking the top member with respect to the trays. The center portion of the top member may include a hub wall which cooperates with the hub wall of the trays to provide a duct outlet into the atmosphere where at least a portion of the air stream passing through the dehydrator may exit to the atmosphere.

BRIEF DESCRIPTION OF THE DRAWINGS

FIG. 1 shows a perspective view of the food dehydrator including a plurality of vertically stacked trays;

FIG. 2 is a top view of the dehydrator of FIG. 1;

FIG. 3 is a bottom view of the present dehydrator;

FIG. 4 is a cross-sectional view taken along the lines 4—4 in FIG. 2;

FIG. 8 shows a portion of the base member including an electrical switch.

DETAILED DESCRIPTION OF THE PREFERRED EMBODIMENT

Figure 5:
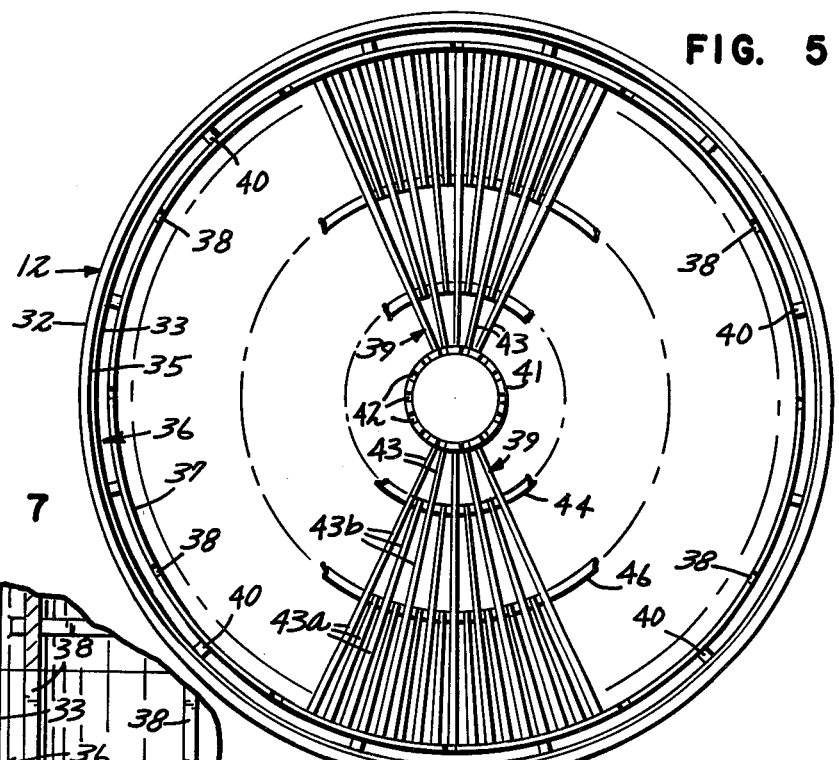
FIG. 5 is a top view of a tray of the present invention.
Figure 7:
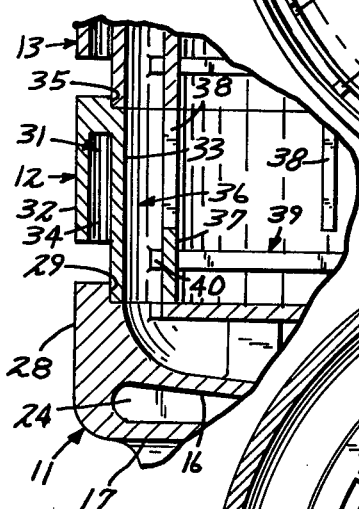
FIG. 7 is an enlarged cross-sectional portion showing engagement of adjacent trays and the base member.
Figure 6:
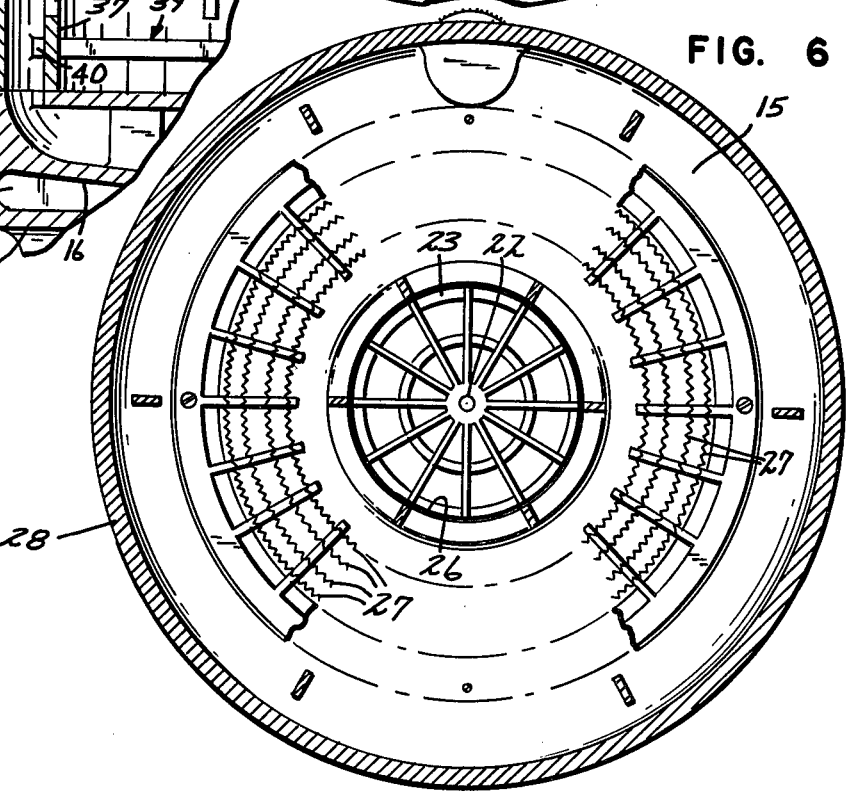
FIG. 6 is a top view of the base member taken along the line 6—6 in FIG. 4.

The food dehydrator 10 as seen in FIGS. 1-3 may include a base member 11, a plurality of trays such as 12 and 13 as well as a top member 14. The base member 11, trays 12 and 13 and top member 14 may be suitably formed such as by injection molding of a thermoplastic material.

The base member 11 (FIGS. 3 and 4) may include an upper wall 16 and a lower wall 17. The lower wall 17 may include a plurality of openings 18 which serve as an air inlet for the dehydrator 10. The lower wall 17 further includes a pocket 19 in which a blower 21 may be disposed. The blower 21 may be secured to the wall 17 such as by screws (not shown). The blower 21 may include an upwardly extending shaft 22 which drives a blower blade 23. The upper wall 16 is spaced from wall 17 so as to provide an insulating zone 24. The upper wall 16 may include a single or plurality of openings 26 through which the air stream may pass to the electrical resistance heater 27. The air stream, of course, is moved by the rotating blower blade 23. The base member 11 may include a circumferential wall 28. A channel 29 is provided in the upper surface of wall 28 for reception of the adjacent tray 12.

The plurality of stackable trays are illustrated by tray 12 shown in FIGS. 4 and 5. Tray 12 may include an insulating zone 31 which consists of an outer wall 32 and an inner wall 33. Space 34 is provided between walls 32 and 33. Wall 33 further serves as a support and may rest in the adjacent channel 29 of base member 11. Wall 33 may have a channel 35 defined therein for engagement of the next higher tray 13. Such engagement serves to lock the trays against axial movement.

An air duct 36 is defined between wall 33 and a duct wall 37. A plurality of supports 40 extend between walls 33 and 37. Each of the walls 32, 33 and 37 runs circumferentially around the tray 12. It is to be noted that duct 36 opens downwardly to receive air and upwardly to pass on at least a portion of the air so received. The wall 37 includes a plurality of slot-like openings 38 through which air may pass. The tray 12 includes a support portion 39 which extends from the wall 37 to a hub-like wall 41 at the center of tray 12. Wall 41 includes a plurality of slot-like openings 42 through which the air stream may pass. The wall 41 serves as a duct to return a portion of the air stream to the blower 21 and a portion of the air stream upwardly through the adjacent trays to the atmosphere. The support surface 39 may be comprised of a plurality of spoke-like members 43 as illustrated in FIG. 5. The spokes 43 may be supported by ring-like ribs 44 and 46. Shorter spoke-like members 43a and 43b may be provided between the spoke-like members 43. Space may be provided between each of the spoke-like members 43, 43a and 43b so that air may pass through the support surface 39.

The top member 14 serves to enclose the uppermost tray and has a bottom wall and a top wall 48 which serve to provide an insulating zone 49 therebetween. The zone 49 serves to prevent upward loss of heat from the dehydrator 10. The top member 14 further includes a pair of concentric outer walls 51 and 52 which provide an insulating zone 53 thereby preventing lateral loss of heat.

OPERATION OF THE INVENTION

Although operation of the present invention is apparent from the preceding description, it will be detailed hereinafter in order to provide a more complete understanding of the present invention. The dehydrator 10 may be placed in operation by manually moving the switch 25 (FIGS. 1 and 8) from an "off" position to an "on" position. When switch 25 is in the "on" position, blower 21 is placed in operation and electrical current is fed to the resistant heater 27. Blower 21 pulls an air stream into the dehydrator 10 through the openings 18 in bottom member 11. The blade 23 of blower 21 further draws the air stream through openings 26 moving the air stream radially outwardly to the duct 36 of tray 12. A portion of the air stream then moves through the openings 38 in circumferential wall 37 and subsequently passes across the food product which is supported on spoke-like members 43, 43a and 43b entering the openings 42 in hub wall 41. Since the spokes 43 are aligned with the direction of air flow they do not create a disturbance in the airstream. The spokes 43 also permit air to move beneath the food product and between adjacent spokes. The present dehydrator promotes uniform drying in several ways. It is to be noted, for example, that dry air enters around the circumference of the tray, picks up moisture and moves more rapidly as it approaches the center of the tray thereby also drying uniformly the food product in the inner areas of the tray thereby compensating for temperature drop and increasing moisture content of air. The air after passing through openings 42 may either move upwardly and out of the dehydrator 10 or downwardly into blade 23 for recirculation through the drying trays 12, 13 and the like.

Various modifications may be made to the details of the present invention without departing from the broader scope of the invention. For example, other types of heating apparatus may be provided.

What is claimed is:

1. A food dehydrator comprising:
    base means including inlet means for receiving a flow of air from the atmosphere, means for positively moving said air flow through the food dehydrator, and means for heating said air flow;
    a plurality of circular vertically stackable trays;
    each of said trays including duct means along the circumference of each of trays to permit said air flow to pass from said base means to each of said trays, air inlet means along the circumference of each of said trays to provide that a portion of said air flow moves axially inwardly along each of said trays and air outlet means adjacent the axial center of each of said trays to exhaust at least a portion of said air flow to the atmosphere; and
    top means adapted for superimposing over the uppermost of said trays to substantially close such tray to the atmosphere, said top means including air outlet means for cooperation with the outlet means of said trays to exhaust said air flow to the atmosphere.

2. The food dehydrator of claim 1 wherein said trays each include means for insulating around the circumference thereof.

3. The food dehydrator of claim 2 wherein said insulating means comprise double wall means defining a downwardly opening pocket.

4. The food dehydrator of claim 1 wherein said tray includes a plurality of spoke-like supports, outer circumferential wall means and inner hub wall means, at least a portion of said spoke-like supports extending from said circumferential wall means to said hub wall means.

5. The food dehydrator of claim 1 wherein said circumferential walls means include a plurality of spaced, vertically oriented slots which serve as air stream inlets and wherein said hub wall means include a plurality of spaced, vertically oriented slots which serve as airstream outlets.

6. A circular food dehydrator comprising a base member, a plurality of trays and a top member, said base member including means for heating an air stream, blower means for moving a stream of air through said heating means and into said trays, said trays being stackable on said base member, said trays each including duct means along the circumference thereof for receiving said air stream from said base member and passing a portion of said air across said tray and the remaining portion of said air stream to the next tray, said trays including central duct means which exhaust at least a portion of said air stream, said top member serving to substantially enclose the uppermost of said trays, whereby said blower means feeds a stream of air through said heating means and to the circumference duct means of said trays, said airstream passing uniformly across each of said trays and at least a portion of said air stream exhausting to the atmosphere.

* * * * *